United States Patent Office 3,146,230
Patented Aug. 25, 1964

3,146,230
14β,21-EPOXY-PREGNANES AND METHOD OF PREPARING THE SAME
Francis J. McEvoy, Pearl River, and Milton D. Heller and Seymour Bernstein, New City, N.Y., assignors to American Cyanamid Company, Stamford, Conn., a corporation of Maine
No Drawing. Filed Aug. 28, 1962, Ser. No. 220,034
14 Claims. (Cl. 260—239.55)

This invention relates to new pregnanes. More particularly, it relates to 14β,21-epoxy pregnanes, intermediates and methods of preparing the same.

The novel steroids of the present invention can be, in general, illustrated by the following formula:

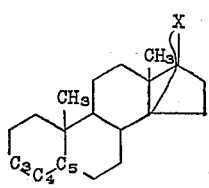

wherein $C_3$ is a member of the group consisting of

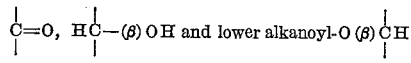

$-C_4-C_5-$ is a member of the group consisting of

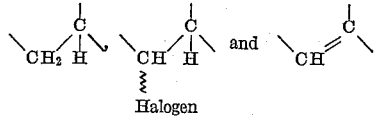

X is a divalent radical of the group consisting of

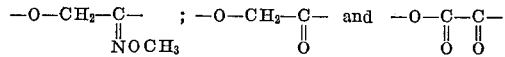

radicals and when $C_3$ is

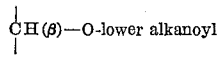

then X is selected from the group consisting of

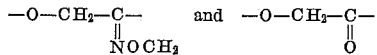

radicals.

The compounds of the present invention are, in general, crystalline solids substantially insoluble in water and somewhat soluble in the usual organic solvents such as acetone or benzene.

The process to prepare the present compounds uses as starting material, for example, 3β-acetoxy-14β,21-dihydroxy-14β-pregnan-20-one described by Reichstein et al., Helv. Chim. Acta, 30, 1508 (1947). When this compound is reacted with methoxyamine hydrochloride in a solvent in the presence of potassium acetate, 3β-acetoxy-20-methoxyimino-14β-pregnan-14β,21-triol (I) is obtained. The latter steroid when contacted with methanesulfonyl chloride produces 3β-acetoxy-21-methanesulfonyloxy-20-methoxyimino-14β-pregnan-14β-ol (II). When compound (II) is heated with an alcoholic alkali metal hydroxide the product obtained is 20-methoxyimino-14β, 21-epoxy-14β-pregnan-3β-ol (III). Heating the latter steroid under acidic conditions in a solvent produces 3β-hydroxy-14β,21-epoxy-14β-pregnan-20-one (IVA). Acetylating the latter compound produces 3β-acetoxy-14β,21-epoxy-14β-pregnan-20-one (IVB). The steroid (IVA) when reacted with chromic acid in the presence of sulfuric acid produces 14β,21-epoxy-14β-pregnane-3,20-dione (V). The latter compound when treated with bromine and hydrogen bromide produces 4-bromo-14β,21-epoxy-14β-pregnane-3,20-dione (VI). The latter steroid on heating with lithium chloride in the presence of a solvent produces 14β,21-epoxy-14β-pregn-4-ene-3,20-dione (VII). When the steroid 3β-hydroxy-14β,21-epoxy-14β-pregnan-20-one (IVA) is reacted with chromic acid in acetic acid the product obtained is 14β-hydroxy-3,20-diketo-14β-pregnan-21-oic acid 21,14-lactone (VIII). The latter steroid on contacting with bromine in the presence of acetic acid produces 4-bromo-14β-hydroxy-3,20-diketo-14β-pregnan-21-oic acid 21,14-lactone (IX). The latter on heating with lithium chloride in the presence of dimethylformamide produces 14β-hydroxy-3,20-diketo-14β-pregn-4-en-21-oic acid 21,14-lactone (X). The preparation of the various compounds described above is shown in the following flowsheet.

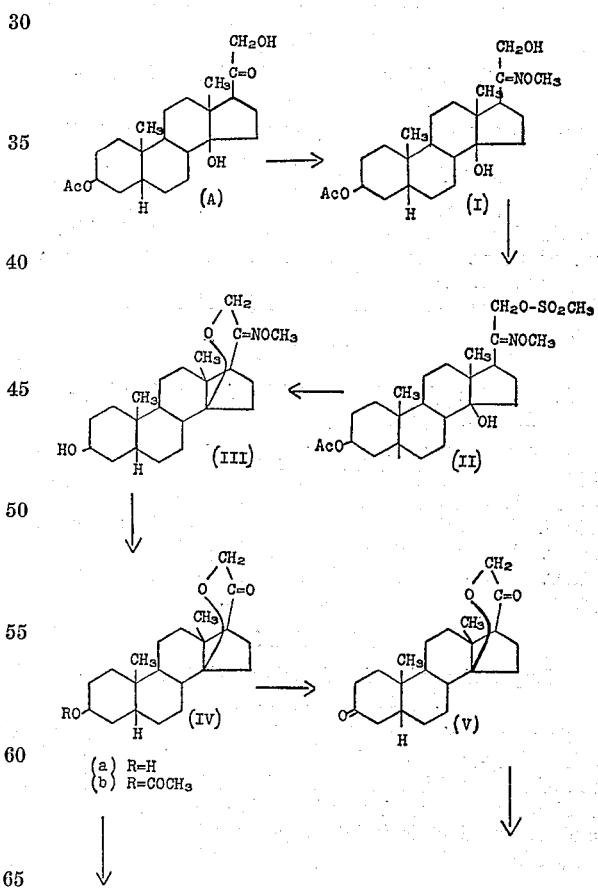

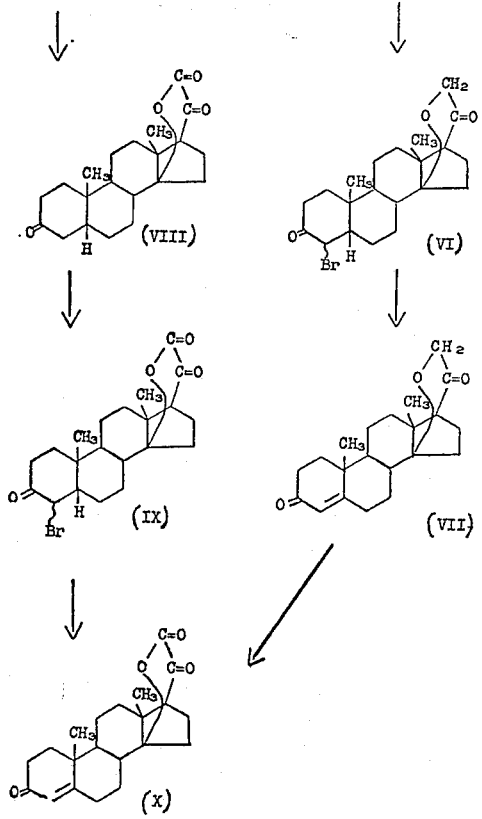

The present compounds have been found to possess diuretic activity. They are, therefore, useful in the treatment of edema and elimination of fluid in the tissues in conditions such as ascites, and cardiac malfunctions.

The following examples illustrate in detail the preparation of representative compounds of the present invention.

EXAMPLE 1

*Preparation of 3β-Acetoxy-20-Methoxyimino-14β-Pregnan-14β,21-Diol (I)*

To a solution of 300 mg. of 3β-acetoxy-14β,21-dihydroxy-14β-pregnan-20-one and 300 mg. of methoxyamine hydrochloride in 45 ml. of methanol is added a solution of 600 mg. of potassium acetate in 6 ml. of water. The solution is refluxed for 18 hours and then diluted with 30 ml. of water. The aqueous solution is extracted with ethyl acetate. Evaporation of the organic extract yields the product, $v_{max}$ 3380, 1734, 1710 (shoulder) 1252, 1230 cm.$^{-1}$.

EXAMPLE 2

*Preparation of 3β-Acetoxy-21-Methanesulfonyloxy-20-Methoxyimino-14β-Pregnan-14β-Ol (II)*

A solution of 290 mg. of 3β-acetoxy-20-methoxyimino-14β-pregnane-14β,21-diol in 5 ml. of pyridine is cooled to −32° C., and 0.27 ml. of methanesulfonyl chloride is added. The solution is maintained at −5° C. for 22 hours. The product is precipitated by the addition of water. Recrystallization from acetone-petroleum ether gives melting point 149–150° C., dec.

EXAMPLE 3

*Preparation of 20-Methoxyimino-14β,21-Epoxy-14β-Pregnan-3β-Ol (III)*

To a suspension of 710 mg. of 3β-acetoxy-21-methanesulfonyloxy-20-methoxyimino-14β-pregnan-14β-ol in 71 ml. of methanol is added 10.4 ml. of 3% methanolic potassium hydroxide. The mixture is refluxed for 3 hours and the product is isolated by the addition of water; $v_{max}$ 3450, 1052, 1032, 1082, 1092 cm.$^{-1}$.

EXAMPLE 4

*Preparation of 3β-Hydroxy-14β,21-Epoxy-14β-Pregnan-20-One (IVA)*

A solution of 2.5 g. of 20-methoxyimino-14β,21-epoxy-14β-pregnan-3β-ol in 250 ml. of methanol and 10 ml. of acetone and 250 ml. of 2 N hydrochloric acid is refluxed for 4 hours. Concentration of the solution produced 1.62 g. of product. Recrystallization from acetone-water gives melting point 194°–197° C.

EXAMPLE 5

*Preparation of 3β-Acetoxy-14β,21-Epoxy-14β-Pregnan-20-One (IVB)*

To a solution of 800 mg. of 3β-hydroxy-14β,21-epoxy-14β-pregnan-20-one in 75 ml. of pyridine is added 0.61 ml. of acetic anhydride and the mixture is allowed to stand for 18 hours at room temperature. Water is added and the 750 mg. of product is collected. Recrystallization from acetone-water gives melting point 130°–134° C.

EXAMPLE 6

*Preparation of 14β,21-Epoxy-14β-Pregnane-3,20-Dione (V)*

To a solution of 100 mg. of 3β-hydroxy-14β,21-epoxy-14β-pregnan-20-one in 35 ml. of acetone, cooled to 5° C. is added a solution of 29.4 mg. of chromic acid and 0.025 ml. of sulfuric acid in 0.11 ml. of water. The mixture is stirred for 5 minutes, then diluted with 175 ml. of water. The product is collected as a white solid. Recrystallization from acetone-water gives melting point 238°–239° C.

EXAMPLE 7

*Preparation of 4-Bromo-14β,21-Epoxy 14β-Pregnane-3,20-Dione (VI)*

A solution of 330 mg. of 14β,21-epoxy-14β-pregnane-3,20-dione in 4.5 ml. of methylene chloride, 4.5 ml. of chloroform and 1.13 ml. of acetic acid is cooled to −40° C. To the mixture is added dropwise a solution of 0.052 ml. of bromine in 0.245 ml. of 30% hydrogen bromide in acetic acid and 0.75 ml. of acetic acid. The addition takes 40 minutes and the solution is stirred an additional 30 minutes. A solution of 164 mg. of anhydrous sodium acetate in 1.4 ml. of water is added and the mixture is stirred at room temperature for 30 minutes. The organic solvents are removed under reduced pressure and the addition of 19 ml. of water precipitates the product. Recrystallization from acetone-water gives melting point 191°–192° C.

EXAMPLE 8

*Preparation of 14β,21-Epoxy-14β-Pregn-4-Ene-3,20-Dione (VII)*

A mixture of 165 mg. of 4-bromo-14β,21-epoxy-14β-pregnane-3,20-dione and 330 mg. of lithium chloride in 5 ml. of dimethylformamide is heated at 100°–110° C. in a nitrogen atmosphere for 3 hours. The solution is cooled, diluted with methylene chloride and washed with sodium bicarbonate solution. The organic solution is dried with magnesium sulfate and the solvent is evaporated under reduced pressure leaving a white solid. The solid is dissolved in methylene chloride and chromatographed on a synthetic magnesium silicate column. Elution with acetone-methylene chloride (1:50) gives the desired product. Recrystallization from acetone-water gives melting point 193°–195° C., $\lambda_{max.}^{MeOH}$ 240 mμ ($\epsilon$ 15,580)

EXAMPLE 9

*Preparation of 14β-Hydroxy-3,20-Diketo-14β-Pregnan-21-Oic Acid 21,14-Lactone (VIII)*

To a solution of 250 mg. of 3β-hydroxy-14β,21-epoxy-14β-pregnan-20-one in 10 ml. of acetic acid is added a solution of 250 mg. of chromic acid in 2.5 ml. of 90% acetic acid. The mixture is allowed to stand at room temperature for 18 hours, then diluted with methanol and water. The mixture is extrcated with ethyl acetate and the product is obtained by evaporation of the organic extract. Recrystallization from acetone-water gives melting point 255–256° C.

EXAMPLE 10

*Preparation of 4-Bromo-14β-Hydroxy-3,20-Diketo-14β-Pregnan-21-Oic Acid 21,14-Lactone (IX)*

To a solution of 490 mg. of 14β-hydroxy-3,20-diketo-14β-pregnan-21-oic acid 21,14-lactone in 32 ml. of acetic acid is added a solution of 0.073 ml. of bromine in 8 ml. of acetic acid. Water is added and the product is collected. Recrystallization from acetone-water gives melting point 197° C., dec.

EXAMPLE 11

*Preparation of 14β-Hydroxy-3,20-Diketo-14β-Pregn-4-en-21-Oic Acid 21,14-Lactone (X)*

A mixture of 134 mg. of 4-bromo-14β-hydroxy-3,20-diketo-14β-pregnan-21-oic acid 21,14-lactone and 268 mg. of lithium chloride in 5 ml. of dimethylformamide is heated at 100°–110° C. in a nitrogen atmosphere for 5 hours. The solution is cooled, diluted with methylene chloride and washed with saturated aqueous sodium bicarbonate solution and water. The organic solution is evaporated to dryness under reduced pressure and the residue is chromatographed on synthetic magnesium silicate to yield the product. Recrystallization from acetone-water gives melting point 261°–262° C.

EXAMPLE 12

*Preparation of 14β-Hydroxy-3,20-Diketo-14β-Pregn-4-en-21-Oic Acid 21,14-Lactone (X)*

To a solution of 84 mg. of 14β,21-epoxy-14β-pregn-4-ene-3,20-dione in 3 ml. of acetic acid is added a solution of 84 mg. of chromic acid in 0.8 ml. of 90% aqueous acetic acid. The mixture is allowed to stand at room temperature for 18 hours, then diluted with methanol and water. The mixture is extracted with ethyl acetate and the product is obtained by evaporation of the organic extract. Recrystallization from acetone-water gives melting point 259–261° C.

We claim:

1. A steroid of the formula:

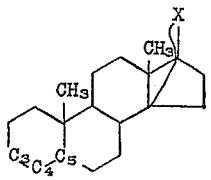

wherein $C_3$ is a member of the group consisting of

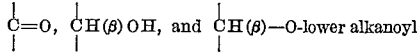

—$C_4$—$C_5$— is a member of the group consisting of

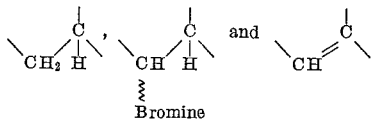

X is a divalent radical of the group consisting of

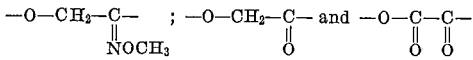

and when $C_3$ is

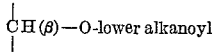

then X is selected from the group consisting of

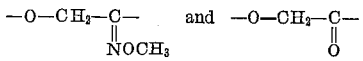

2. The compound 3β-hydroxy-14β,21-epoxy-14β-pregnan-20-one.

3. The compound 3β-acetoxy-14β,21-epoxy-14β-pregnan-20-one.

4. The compound 14β,21-epoxy-14β-pregnane-3,20-dione.

5. The compound 14β-hydroxy-3,20-diketo-14β-pregnan-21-oic acid 21,14-lactone.

6. The compound 4-bromo-14β-hydroxy-3,20-diketo-14β-pregnan-21-oic acid 21,14-lactone.

7. The compound 14β-hydroxy-3,20-diketo-14β-pregn-4-en-21-oic acid 21,14-lactone.

8. The compound 3β-acetoxy-20-methoxyimino-14β-pregnan-14β,21-diol.

9. The compound 3β-acetoxy-21-methanesulfonyloxy-20-methoxyimino-14β-pregnan-14β-ol.

10. The compound 20-methoxyimino-14β,21-epoxy-14β-pregnan-3β-ol.

11. The compound 4-bromo-14β,21-epoxy-14β-pregnane-3,20-dione.

12. The compound 14β,21-epoxy-14β-pregn-4-ene-3,20-dione.

13. A method of preparing 20-methoxyimino-14β,21-epoxy-14β-pregnan-3β-ol which comprises heating 3β-lower alkanoyloxy-21-methanesulfonyl-20-methoxyimino-14β-pregnan-14β-ol in a lower alkyl alcoholic solvent in the presence of an alkali metal hydroxide.

14. A method of preparing 20-methoxyimino-14β,21-epoxy-14β-pregnan-3β-ol which comprises contacting 3β-lower alkanoyl - 20-methoxyimino-14β-pregnane-14β,21-diol with methanesulfonyl chloride in the presence of a solvent, heating the resulting reaction product in a lower alkyl alcohol in the presence of an alkali metal hydroxide and recovering said product therefrom.

References Cited in the file of this patent

Tschesche: "Angewandte Chemie," vol. 73, No. 2, 1961, pp. 727–735.

Ragab et al.: "Helvetica Chimica Acta," vol. XLV, Feb. 1, 1962, pp. 152–170.

Bernoulli et al.: "Helvetica Chimica Acta," vol. XLV, Feb. 1, 1962, pp. 240–251.